United States Patent [19]

Deisenroth et al.

[11] 4,064,751
[45] Dec. 27, 1977

[54] FLOWMETER
[75] Inventors: Norbert F. Deisenroth, Des Plaines; John P. Nordhaus, Northbrook; Abe Siegelman, Morton Grove, all of Ill.
[73] Assignee: Elematic Instrument Corporation, Morton Grove, Ill.
[21] Appl. No.: 733,182
[22] Filed: Oct. 18, 1976
[51] Int. Cl.² .............................................. G01F 1/40
[52] U.S. Cl. .................................................... 73/207
[58] Field of Search ........................... 73/207, 208, 210
[56] References Cited

U.S. PATENT DOCUMENTS

| | | | |
|---|---|---|---|
| 2,262,807 | 11/1941 | Larner | 73/207 |
| 2,581,588 | 1/1952 | Greene | 73/207 |
| 2,587,701 | 3/1952 | Davis, Jr. | 73/208 |
| 2,598,910 | 6/1952 | Head | 73/207 |
| 2,638,582 | 5/1953 | Urso et al. | 73/207 X |
| 2,727,388 | 12/1955 | Ekstrom | 73/208 |
| 3,234,790 | 2/1966 | Ekstrom | 73/210 |

Primary Examiner—Herbert Goldstein
Attorney, Agent, or Firm—Silverman & Cass, Ltd.

[57] ABSTRACT

The following specification describes a flowmeter in which a tube secured to a biased bellows for movement therewith receives a rod to define a passage having a small radial dimension relative the length of rod received in the tube. The passage provides a pressure drop, which varies linearly with flow rate and moves the bellows and tube to a position corresponding to the flow rate. An indicator rod extends from the tube through a wall of the meter housing to provide an indication of the bellows position and therefore the flow rate.

12 Claims, 12 Drawing Figures

U.S. Patent  Dec. 27, 1977  4,064,751
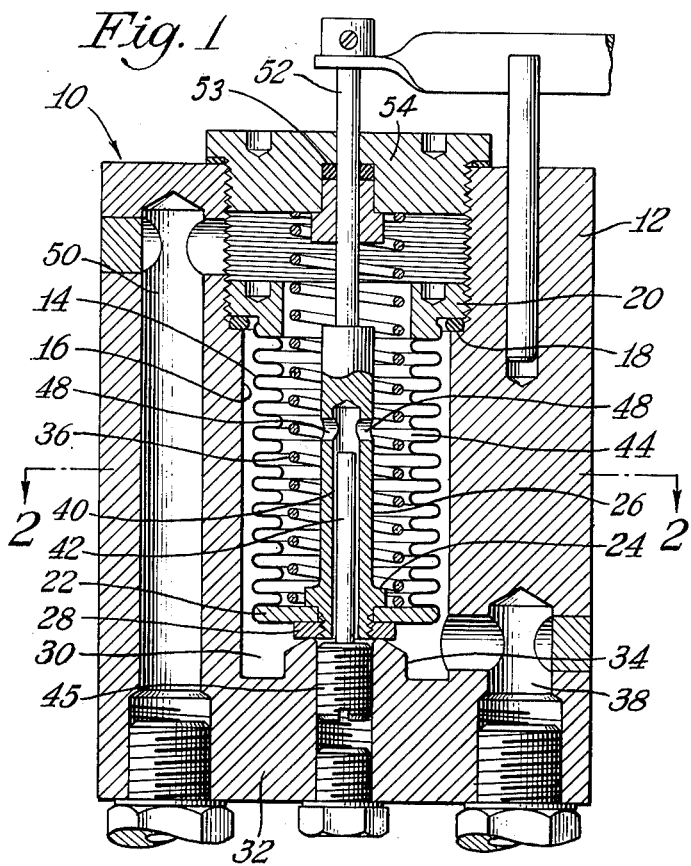
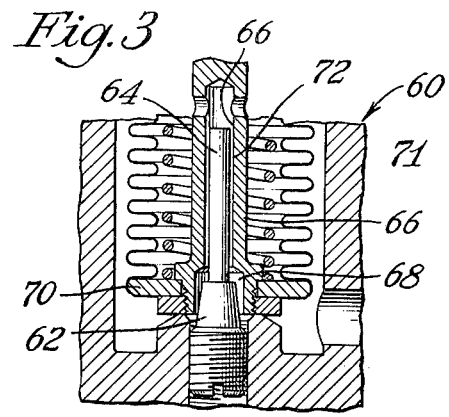
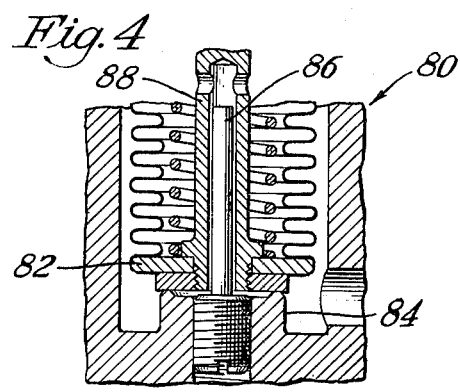
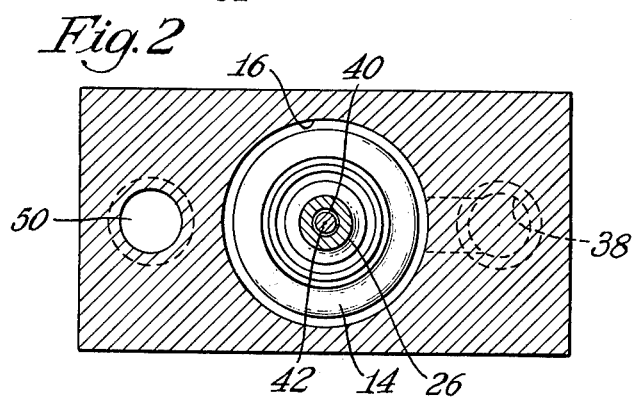
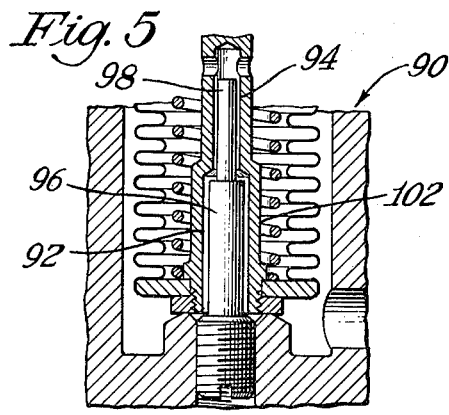
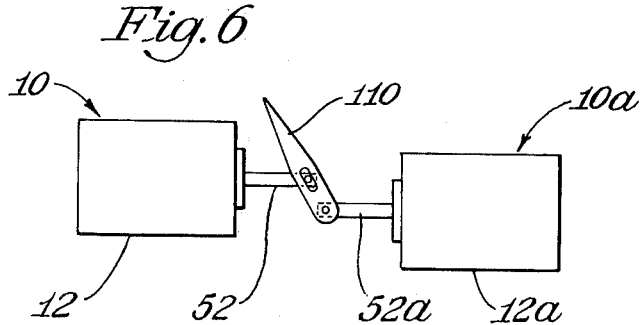

FLOWMETER

FIELD OF THE INVENTION

This invention relates in general to flowmeters and more particularly to an improved and more versatile economical flowmeter for indicating or controlling fluid flow.

SUMMARY OF THE PRIOR ART

Typical prior art fluid flow measurement techniques are reviewed in an article by D. W. Tims and P. L. Palmer of Warren Spring Laboratory entitled Gas Flow Measurements appearing in the Nov. 1961 issue of the periodical entitled Research and Development published in London, Great Britain. As set forth hereinafter the term fluid will be understood to include both gases and liquids.

In the just mentioned article the authors discuss various types of flowmeters including those grouped under the designation flow restriction and differential pressure flowmeters and those grouped under the designation variable orifice meters.

The flow restriction and differential pressure type meters infer the flow rate V from a difference in static pressure $h$ at two spaced points in the fluid stream whereas the varible orifice meters utilize the fluid pressure to move an element relative a variable size orifice to provide a direct indication of the fluid pressure from which the flow rate is inferred.

The flow restriction and differential pressure type meters include capillary tube meters, orifice and venturi type meters and pitot tubes. The capillary tube does provide an output which is generally linear with fluid pressure however there are problems in the manufacture of the small bore capillary tube and the inertial changes in the fluid as it enters and leaves the tube requires a correction factor for properly indicating the flow rate. The orifice type meter requires a restricted plate orifice in the flow path and this creates turbulence in the flow through the orifice and inaccuracy in the reading in addition to the difficulty in calibration. In the venturi type meter fabrication of the throat presents the major problem as compared with other types of restricted flowmeters. The pitot tubes require high velocities for usable readings or the use of auxiliary apparatus is required to increase the differential pressure. The basic problem in the flow restriction type meter, however, remains the need for the static pressure to be determined at each of the spaced positions and if the indication is to be automatically provided some means are required to compare the readings to provide a difference indication or the readings must be taken visually and mentally compared.

For most commercial purposes therefore the variable orifice meter has superseded the flow restriction and differential pressure type meter. The variable orifice type meters require only one indicating device which is operated directly by the gas pressure and because of this simplification have been more generally accepted.

In one type of variable orifice meter, a float or ball rides in a tapered tube to a level at which the gravitational weight of the ball is just balanced by the forces acting on the ball as the fluid stream curves around the ball through the tapered tube. While the ball offers considerable economy, the tapered tube is of course somewhat difficult to fabricate and depending on the materials required for the tube and ball, indication may be a problem if the ball is not easily or directly visible. A more serious defect however is that the tube must be mounted to permit movement of the ball only in a vertical direction and therefore the circumstances in which the meter can be used are severely limited. An alternate form of variable orifice meter includes a hinged plate, however in this device, the force component of the fluid flowing past the plate changes substantially with the angular position of the plate and therefore accuracy with this type of meter is difficult to attain.

A successful variation of the variable orifice meter is shown in U.S. Pat. No. 3,234,790. This meter being free of many of the defects of the other variable orifice meters has attained some success. As shown in the aforementioned patent this meter includes a tapered rod carried by the housing and seated in the opening of an orifice plate carried by a spring biased bellows. As the pressure of the gas flowing between the tapered portion of the rod and the plate orifice changes, the bellows moves to adjust the orifice size to reach a new equilibrium position, while providing a direct indication of the quantity of flowing fluid. The tapered rod however does represent some manufacturing extravagance and reaction to low gas flow rates is difficult since it is difficult to manufacture with a small area variable orifice for low flow rates especially for such gases as helium and hydrogen.

SUMMARY OF THE INVENTION

The present invention proposes a simple but effective fluid flowmeter, utilizing a variable fluid flow resistance element, which responds linearly to fluid flow.

The variable fluid flow resistance element comprises an elongate metering rod received in an elongate tube for a substantial distance as compared to the spacing between the rod and tube. The spacing between the rod and tube defines a passageway, whose length changes in accordance with the distance the rod projects into the tube thereby to define a flow path of variable resistance.

The tube is secured to a spring biased bellows which moves the tube in response to changes in the pressure drop along the passageway. The changes in the pressure drop result from changes in the fluid flow rate which in turn move the bellows and the tube relative to the rod for adjusting or altering the passageway length.

An indicator rod moved in correspondence with the tube movement and projecting from the housing of the flowmeter assumes a position corresponding to the passageway length for any given flow rate. For passageways of constant cross section changes in pressure drop are linearly related to changes in the flow rate, and therefore the indicator rod movement is linearly related to the flow rate. This of course substantially improves the character of the indications provided by the flowmeter.

An additional advantage derived from this arrangement is that a relatively large diameter tube may be used thereby to reduce the problems of economic dimensional control and this condition of course applies also to the rod so that the size of the passageway may be economically held to a desirably small value for creating a large enough pressure drop in the passageway to sense extremely small flow rates and indicate the same.

Several modifications of the basic design are also disclosed. One of these modifications includes a tapered portion on the rod and engaged in an orifice plate for enabling a wide dynamic range of fluid flow to be sensed. Another modification includes the use of a large area orifice plate having a small area exposed to initial fluid inlet pressure to prevent operation of the flowmeter unless a predetermined pressure is applied to the inlet. Another modification utilizes a stepped bore in the tube engaged by a stepped rod for measuring high and low fluid flow rates without a discontinuity therebetween. Still another modification provides a differential flow rate indication by controlling the indicator rod position in accordance with the difference in pressure sensed at two fluid passageways of the described character.

It is therefore one object of the present invention to provide an improved, versatile, and/or more economical fluid flowmeter.

It is another object of the present invention to provide an improved flowmeter for indicating low gas flow rates.

Other objects and the features of the present invention will become apparent on examination of the following specification and claims together with the accompanying drawings.

BRIEF DESCRIPTION OF THE DRAWINGS

FIG. 1 is a sectional view illustrating a flowmeter incorporating the principles of the present invention.

FIG. 2 is a sectional view taken generally along the line 2—2 in FIG. 1.

FIG. 3 is a generally schematic view illustrating a modified portion of the flowmeter of the type shown in FIG. 1.

FIG. 4 is a generally schematic view illustrating a modified portion of a flowmeter of the type shown in FIG. 1.

FIG. 5 is a generally schematic view illustrating a modified portion of the flowmeter shown in FIG. 1; and FIG. 6 is a schematic view of a flowmeter incorporating the principles of the present invention for indicating differential flow rate.

DESCRIPTION OF THE PREFERRED EMBODIMENT

In FIG. 1 a flowmeter incorporating the principles of the present invention is indicated by the reference character 10. The flowmeter 10 includes a housing 12 having a bellows 14 located in an axially extending bore 16 formed in the housing 12.

The bellows 14 is secured at one end in sealed relationship against a shoulder or flange 18 formed in bore 16 of housing 12 by means of a threaded bellows header ring 20 threaded into one end of the housing 12. The other or free end of the bellows 14 carries a bellows plate 22 sealed to the bellows free end and secured in sealed relationship against an external peripheral shoulder or flange 24 formed on a tube 26 by means of a locking nut or ring 28 threaded on the adjacent end of the tube 26.

One face of the bellows plate 22 is aligned with an annular chamber or passage 30 formed in an end wall 32 of the housing 12 and spaced opposite the bellows header ring 20. The tube and/or nut 28 bear at one axial end against the axial end of a boss 34 forming the inner diameter or surface of the annular chamber 30 under the influence of a biasing spring 36, which also serves to extend or bias the bellows toward boss 34. An inlet port or passage 38 in the housing 12 communicates fluid through a hollow from a source (not shown) to chamber 30. The fluid from port 38 is initially applied to the plate 22 for moving the bellows and tube axially of chamber 30 in the direction of the bellows header ring 20 for enabling communication of the fluid from the port 38 to a cylindrical passage or passageway 40 formed between the inner surface of the tube 26 and a metering rod 42 projecting along the tube axis from a threaded plug 45 adjustably positioned in boss 34. Flow thence proceeds through openings 48 and out through duct 50 by way of the bellows interior, the ring 20, the upper port into duct 50 and the lower left hand hollow fitting (FIG. 1).

The rod 42 extends into the tube 26 for a substantial distance, as compared with the cross sectional area of the passage 40 so that the length or axial extent of passage 40 is many times the cross sectional spacing between the rod and tube defining the passage 40. The length of passageway 40 is usually chosen to be at least five times the spacing. The cross sectional shape or peripheral surface of the tube 26 and the rod 40 may be varied, as desired, so long as the spacing therebetween is small as compared to the length of the passage 40. If desired support or guide flanges may be provided between the outer rod surface and the inner tube surface. It will be understood however that a circular configuration for both the rod and tube as seen in FIG. 2 provides a most economical arrangement since both the rod and tube are thus most easily fabricated in a conveniently large diameter, while maintaining a desirably small cross section for the passage 40.

The passage 40 communicates with a chamber 44 defined by the bellows 14, the bellows header ring 20 and the bellows plate 22 by means of one or more cross bores 48 located adjacent the end of tube 26 spaced from the boss 34. The chamber 44 in turn communicates fluid through the hollow fitting at the bottom of the passage 50 to a desired output (not shown).

The end of the tube 26 spaced from the boss 34 is secured to an indicator rod 52, which extends through an O-ring seal 53 in the indicator rod sealing cap 54 for longitudinal or axial movement through said cap 54. The indicator rod 52 may of course be utilized for operating an indicating mechanism as shown or described in the aforementioned U.S. Pat. No. 3,234,790. Alternatively, the rod provides an indication of its position through any one of a number of expedients such as magnetic or optical sensing of the indicator rod position with any one of a number of conventional analog or digital displays.

In operation a fluid such as hydrogen gas, for example, is introduced through the inlet port 38 to chamber 30 and the pressure thereof serves to move or compress the bellows 14 in one axial direction toward header ring 20 thereby placing the passage 40 in communication with the inlet port 38. The gas now flows through the passage 40 and through the bores 48 in tube 26 into the chamber 44 to the outlet port 50, while the indicator rod having been moved from its initial position moves to a position corresponding to the bellows position for indicating the flow rate at which the gas is flowing.

The pressure drop through the passage 40 for a given length of rod 42 within the tube 26 assumes a value proportional to that length and therefore with the flow rate constant the pressure drop between the inlet 38 and chamber 44 is translated into a corresponding axial position of the bellows 14, tube 26 and indicator rod 52. The rod 52 in turn provides an indication external to the housing of the bellows position and therefore the flow rate.

As the gas flows, its rate of flow may vary. If the gas flow rate increases the restricted passage 40 will create a linearly related larger pressure drop between chambers 30 and 44. This larger pressure drop in turn moves the bellows 14 and tube 26 further from the boss 34 until the force on the bellows is balanced by the spring force of the spring 36 and the bellows 14. The length of rod 42 in tube 26 thus shortens and the change in coupling length is linearly related to a linear incremental change in the pressure drop through passage 40, which is balanced by the linear spring rates of the bellows and spring. The indicator rod 52, in the meantime, moves through a linearly related increment to a new position linearly related to its initial position and indicates the new flow rate. Thus a change in the flow rate is indicated by a linear incremental movement of the indicator rod 52.

In the event the flow rate should decrease the pressure drop in fluid resistance passage 40 falls creating a smaller difference in pressure between the chambers 30 and 44 so that the bellows 14 and tube 26 move axially in the opposite direction toward the boss 34 under the influence of the spring 36 and bellows 14 in response to the pressure drop. As soon as the tube 26 moves to a position in which the force of the bellows and spring 36 is balanced by the pressure drop between chamber 30 and chamber 44 the movement terminates. The indicator rod having been moved with the tube 26 and bellows 14 in a movement linearly related to the pressure drop now indicates the new flow rate. The pressure drop from chamber 30 to chamber 44 is essentially the drop through passage 40 which length is equal to the distance of penetration of rod 42 in tube 26.

In FIG. 3 a combination of a variable resistance flowmeter of the type shown in FIG. 1 and a variable area orifice is schematically indicated by the reference character 60. The combination 60 includes a tapered portion 62 interposed on a rod 64 between the rod and tube 66 with the tapered portion 62 engaged in a generally large diameter opening 68 of the bellows or orifice plate 70. Combination 60 is useful for sensing fluid flow rates having a large dynamic range, since the tapered portion 62 enables the rod 64 to adopt a position corresponding to large changes in fluid pressure, as the pressure differential activating the bellows 71 is the result of the sum of the pressure drop in the opening 68 as well as the pressure drop in the long annular passageway 72 between the surfaces of rod 64 and tube 66.

FIG. 4 schematically illustrates by the character 80 a portion of a flowmeter similar to that shown in FIGS. 1 and 2 except that a relatively large seating area is provided between the bellows orifice plate 82 and a boss 84. A rod 86 projects from boss 84 into a tube 88 extending from plate 82 for cooperation with rod 86 as previously explained. With this arrangement fluid flow at extremely low fluid pressure levels is prevented to avoid flow through the meter in the event the inlet pressure is below a predetermined value selected as may be desired.

FIG. 5 schematically illustrates by the reference character 90 a flowmeter similar to that illustrated in FIG. 1. In this modification two long annular tandem or serially arranged passageways 92 and 94 are provided through which the fluid flows and each passageway provides a pressure drop for a respective fluid flow rate range. Stepped passage portions are formed by stepped portions 96 and 98 on rod 100 having shoulder therebetween and located in correspondingly stepped portions of a tube 102. With this arrangement fluid flow rates of a wide dynamic range easily can be indicated. It will be appreciated that numerous variations in the cross sectional countour of the tube and rod may be effected to control the movement of the indicator as a function of the fluid flow rate.

In FIG. 6 connected portions of two indicating rods 52 and 52a are indicated projecting from housing 12 and 12a respectively. The rods 52 and 52a are each connected to a tube of the type shown and described in FIG. 1 and are interconnected by a link 110. The housings 12 and 12a each contain a flowmeter 10 and 10a respectively of type similar to that described in FIG. 1. As may be appreciated the rods 52 and 52a will each be moved in response to the flow rate of a fluid moving through the respective housing 12 and 12a, however the movement of each rod 52 and 52a will of course be determined by the movement or flow rate of a gas through the other housing since the link 110 transmits the bellows movement in one housing to the bellows of the other housing. The movement of the rods 52 and 52a will therefore correspond to the differential pressure of the fluid flowing in each housing so that the link 110 between the rods moves to a corresponding position for indicating the differential flow rate.

The foregoing constitutes a description of an improved flowmeter capable of numerous modifications, such as the substitution of telescoping tubes in place of the described rod and tube. Therefore the inventive concepts are not believed limited to the disclosed embodiment, but are believed covered by the accompanying claims.

What is claimed is:
1. A flowmeter comprising
  A. a housing having means defining a fluid flow path through the housing and including inlet and outlet ports communicating with the path and adapted respectively to be connected to a fluid source and fluid output means, the flowmeter adapted to measure pressure differential between said inlet and outlet ports,
  B. said fluid flow path including a hollow, elongate tubular member and means mounting and guiding the tubular member for rectilinear axial movement within said housing, the interior of said tubular member comprising an elongate passageway having a fluid connection with said outlet port adjacent one end of said tubular member and the mounting and guiding means including biasing means urging the tubular member to move axially in the direction of the second end of said tubular member,
  C. said mounting and guiding means having a fluid pressure responsive axially facing portion located adjacent the second end of the tubular member and connected therewith and generally coaxial thereof adapted to move the tubular member against urging of the biasing means when the said portion is subjected to fluid pressure greater than the said urging, said elongate passageway having an entrance at the second end of said tubular member in the center of said axially facing portion,
  D. said housing having a fluid inlet chamber formed at least adjacent to the axially facing portion with the axially facing portion exposed to said fluid inlet chamber, a projection formed in said housing and having an annular seat in alignment with said axially facing portion and said axially facing portion being urged towards said seat in response to said biasing means to constrict said entrance, said fluid inlet chamber being otherwise fluid-isolated from the outlet port and said fluid connection, E. a rigid rod mounted to said housing in the center of said seat coaxial with the elongated passageway and extending substantially fully into said passageway when said portion is in its most constricting position, but being of lesser cross section than the passageway to form a narrow fluid flowing space around the rod in the passageway, the said fluid connection comprising an opening in the tubular member located beyond the furthest penetration of the rod, said rod adapted to be withdrawn from said passageway when fluid is admitted to said fluid inlet chamber at a pressure which is sufficient to move said axially facing portion from its most constricted condition away from said seat to increase the distance thereof from said seat and thereby move the tubular member against the urging of said biasing means, F. the cross sectional configuration of the interior of the passageway and that of the rod each being uniform along a substantial portion of the axial length of both where they are opposite one another during movement of said tubular member, G. the penetration of the rod into the passageway comprising a fluid resistance section in the flow of fluid through the housing in the said fluid flowing space between rod and passageway whose fluid resistance varies linearly with the pressure drop between the said inlet chamber and the outlet port and with the axial movement of the said tubular member and H. said tubular member having means for providing an indication externally of said housing of the amount of movement of said tubular member.

2. The flowmeter as claimed in claim 1 in which the axially facing portion is normally engaged against said seat during conditions of low pressure differential between the inlet chamber and outlet port and the said constriction is a complete blocking of said entrance.

3. The flowmeter as claimed in claim 2 in which means are provided for increasing the pressure differential required to unblock the entrance.

4. The flowmeter as claimed in claim 1 in which the length of the fluid flowing space between the rod and passageway is substantially greater than the radial dimension of the space.

5. The flowmeter as claimed in claim 1 in which the interior configuration of the said substantial portion of said elongate passageway is cylindrical, the substantial portion of said rod is cylindrical and the fluid flowing space is in the form of a cylindrical tube formed around the rod.

6. The flowmeter as claimed in claim 5 in which there is a second portion of the length of said tubular member which is of a different interior diameter than said first mentioned substantial portion thereof and the rod has a second portion which is of a different diameter than said first mentioned substantial portion thereof whereby to provide two serially connected fluid flowing spaces of different diameter.

7. The flowmeter as claimed in claim 5 in which there is a portion of said rod adjacent its connection to said seat which includes a tapered section and the passageway has an enlarged entrance whereby to provide measurement of pressure drops of large dynamic range.

8. The flowmeter as claimed in claim 1 in which the mounting and guiding means include a bellows connected at one end to said housing and having that same end communicating with said outlet port, the tubular member and axially facing portion being sealed to the opposite end of the bellows whereby the tubular member is generally coaxial with the bellows, the fluid inlet chamber being in fluid contacting engagement with the exterior of the bellows but not its interior.

9. The flowmeter as claimed in claim 8 in which said bellows comprise said biasing means.

10. The flowmeter as claimed in claim 1 in which said biasing means comprise a resilient spring-like member connected at one end to the housing and the other end to said tubular member and axially facing portion.

11. The flowmeter as claimed in claim 1 in which means are provided for axially adjusting the length of the rod which enters into said tubular member.

12. In a flowmeter in which there is a housing having a bellows mounted at one end to the housing and the interior of the bellows connected to an outlet port, the second end of the bellows being free and sealed to a plate, the plate mounting a central hollow cylindrical tubular member providing a central cylindrical passageway connected at the upper end of the tube to the interior of the bellows, the tubular member being coaxial with and on the interior of the bellows and having a rigid extension protruding through the housing and adapted to have an indicating device connected thereto, an inlet chamber having fluid access to the outside of the bellows and communicating with the interior of the bellows only through the passageway, the passageway having an entrance in the plate, the housing having a seat in the inlet chamber coaxial with the entrance and plate, the plate being biased normally against the seat to close the entrance, and a rigid rod mounted in the seat and extending into the passageway a substantial distance, the invention herein comprising structure for rendering the flowmeter a linear pressure differential measuring device and said structure being:

the rod comprising a right cylindrical configuration and having a diameter slightly less than that of the passageway so that there is formed around the rod and within the passageway a fluid flow space that is in the form of a cylindrical tube, the plate adapted to be lifted off the seat when the pressure in the inlet chamber is greater than the pressure in the outlet port by an amount sufficient to overcome the bias, the further movement of the bellows and tubular member axially relative to the rod being determined by the drop in pressure along said fluid flow space and being directly proportional to said drop, hence being a linear measure of fluid flow through said flowmeter.

* * * * *